April 6, 1954     A. PFENNINGER, JR., ET AL     2,674,505
RUBBER MOUNTED BEARING Filed July 7, 1951     2 Sheets-Sheet 1

INVENTORS
Arnold Pfenninger Jr.
and Joseph B. Salistro
BY
Rockwell & Bartholow
ATTORNEYS April 6, 1954   A. PFENNINGER, JR., ET AL   2,674,505
RUBBER MOUNTED BEARING
Filed July 7, 1951                                2 Sheets-Sheet 2

INVENTORS
Arnold Pfenninger Jr.
and Joseph P. Salistro
BY
Rockwell & Bartholow
ATTORNEYS Patented Apr. 6, 1954

2,674,505

UNITED STATES PATENT OFFICE 2,674,505

RUBBER MOUNTED BEARING

Arnold Pfenninger, Jr., Bethany, and Joseph R. Calistro, New Haven, Conn., assignors to The Connecticut Hard Rubber Company, New Haven, Conn., a corporation of Connecticut Application July 7, 1951, Serial No. 235,532

3 Claims. (Cl. 308—184)

This invention relates to a cushion bearing mount, and more particularly to a means for mounting a shaft bearing or the like so that the bearing may be permitted radial play or movement and also a certain amount of axial play, it being desired, however, to limit to some extent the permitted axial movement.

In certain instances where bearings are provided for shafts or other members which must be mounted for rotating or oscillating movement, it is necessary to so support the bearings that a certain amount of movement is permitted both axially and radially and sometimes at an oblique angle to the axis of the bearing. This is true, for example, in connection with supporting the ailerons of an airplane, the ailerons being carried by a yoke or clevis structure which is mounted upon a bolt or rod carried in an anti-friction bearing. These mountings may be placed some distance apart, and a considerable amount of play in the bearing is necessary although it is desirable to suppress the axial play or movement as much as possible.

The present invention relates to a means for mounting the anti-friction bearing in which the rod or shaft is supported and comprises a two-part casing within which the bearing is mounted. This casing comprises inner and outer rings, the inner one of which is secured to the outer race of the anti-friction bearing. The outer ring is of such a size compared to that of the inner ring that a considerable space is provided between the two, and this space is filled with an elastic material which may be natural rubber, silicone rubber, neoprene or any elastomer. This elastic and compressible material will permit the desired amount of play, and means are provided on the opposing surfaces of the inner and outer rings of the mount to suppress the axial movement which is permitted. This is accomplished by placing the elastic material largely under compression rather than under shear as would normally be the case upon axial movement of the bearing.

It has also been found that placing the elastic material under compression instead of under shear will add to the life of this material as it will last approximately ten times as long when employed in this manner.

One object of the invention is to provide a cushion mounting for bearings whereby the bearings so mounted will have limited movement or play.

A still further object of the invention is to provide a cushion mounting for bearings where- in the cushioning material may be natural rubber, a synthetic rubber, or any elastomer so employed that this material will be placed under compression rather than under shear in resisting movements of the bearing.

A still further object of the invention is to provide a cushion mounting for bearings or the like, the mounting comprising inner and outer members of ring-like form surrounding the bearing, and an annular member of cushioning or elastic material between said inner and outer members, the form of the inner and outer members being such that the elastic material will largely be placed under compression.

A still further object of the invention is to provide a cushion mounting for bearings or the like of the type described wherein one or both of the inner and outer ring-like members comprising the mount will be provided with projecting ribs or ridges extending toward the other member whereby the elastic material between such members will be placed under compression when the bearing tends to move axially within the mounting.

To these and other ends the invention consists in the novel features and combinations of parts to be hereinafter described and claimed.

In the accompanying drawings:

Fig. 4 is a sectional view of a bearing mount of somewhat modified form; while

Figure 1:
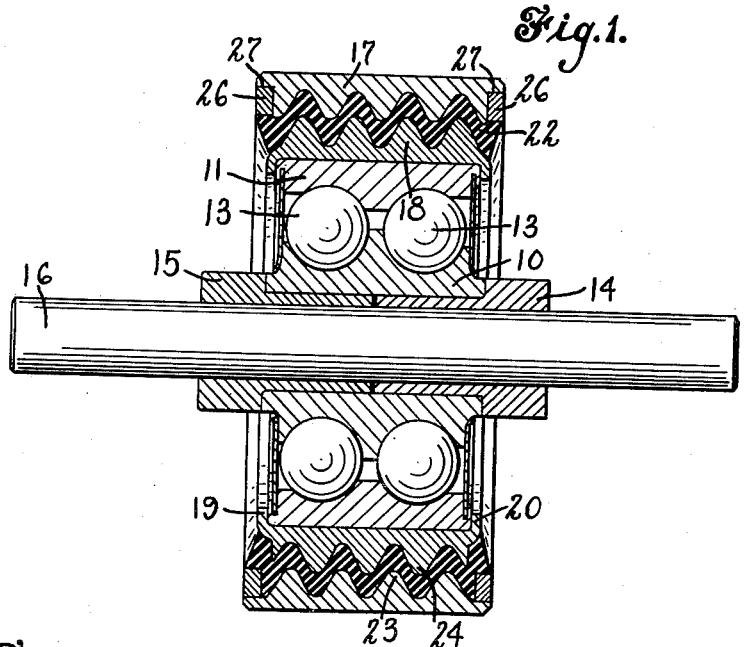
Fig. 1 is a sectional view of a mount for a bearing embodying our invention.

To illustrate a preferred embodiment of our invention we have shown in the drawings a ball bearing which may be of any usual type. As shown, the bearing comprises an inner race member 10, an outer race 11, and anti-friction members or balls 13 mounted between these recesses. As shown, the inner bearing race 10 is provided with an axial opening within which are mounted bushing members 14 and 15, these members having aligned openings within which the shaft or rod 16 is mounted so that this latter member will be rotatably carried by the bearing.

The member 16 may be any type of shaft which is to be rotatably or oscillatably mounted. In the event that it is employed for supporting the ailerons of an airplane, a yoke member or clevis which supports the aileron may be mounted on the projecting ends of the rod 16 so that the yoke may be carried by the anti-friction bearing and have freedom of movement to rotate or oscillate. As previously stated, it is desired that the bearing be permitted a certain amount of movement or play, and the mounting means for supporting the bearing will now be described.

Figure 2:
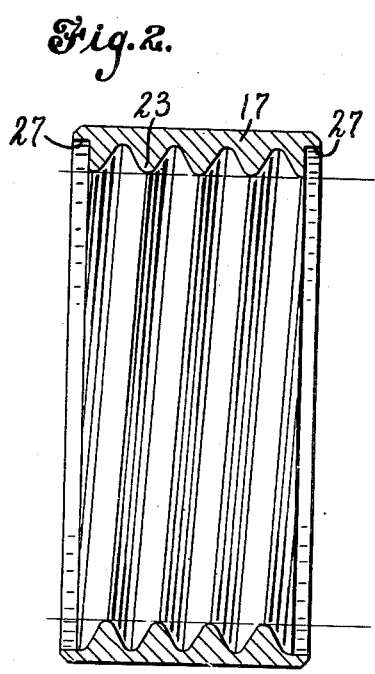
Fig. 2 is a sectional view of the outer ring member of the bearing mount.
Figure 3:
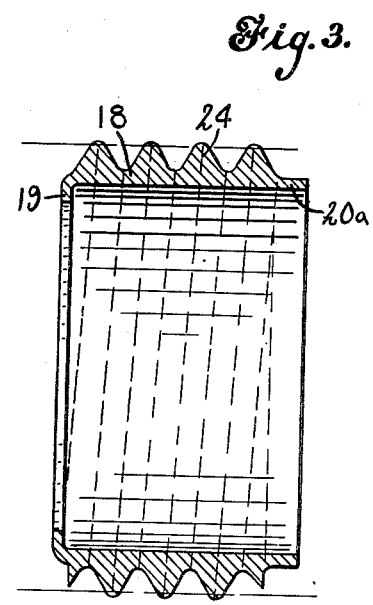
Fig. 3 is a sectional view of the inner ring-like member of the mount.

The mounting means comprises an outer ring-like member 17 shown in Fig. 2 and an inner ring-like member 18 shown in Fig. 3. The latter ring embraces the outer race 11 of the anti-friction bearing, and the edges of this ring may be spun over the edges of the outer race, as shown at 19 and 20 in Fig. 1, to hold the parts in assembled relation. As originally formed, the ring member 18 may, as shown in Fig. 3, be provided with the laterally projecting flange 20ᵃ which may be turned inwardly, as in the flange 19, after the bearing has been inserted therein.

As shown in Fig. 1, a layer of elastic material 22 is placed between the inner and outer rings and bonded to the surface thereof to hold the rings together. This material, as stated, may be of natural rubber, silicone rubber, neoprene, or any elastomer. It will be understood that the outer ring 17 will be rigidly supported, and the elastic material 22 will permit a certain amount of play of the bearing and inner ring with respect to the outer ring, both in a radial and axial direction.

It is desirable in many instances to suppress or limit the axial play, and for this reason projections are provided on one or both of the rings 17 and 18, these projections extending toward the other ring. If projections are formed on both of the members, it is desired that their adjacent edges overlap so that the elastic material 22 is actually placed under compression rather than under shear when resistance is offered to axial play of the bearing.

As shown in Figs. 1 to 3, the outer ring is provided with a series of ribs or ridges 23 and the inner ring provided with a similar series 24, the ribs 23 projecting inwardly and the ribs 24 projecting outwardly. It will also be apparent that when the inner ring is centered within the outer ring, the crests or apices of these ridges will overlap so that if it were attempted to insert the ring 18 into the ring 17, the ridges of the former would interfere with those of the latter and not be permitted to pass. For this reason the ridges 23 and 24 are made in the form of screw threads or formed spirally upon the respective ring members so that the ring 18 may be threaded into the member 17.

When the members 17 and 18 have been assembled and are properly centered, the elastic material 22 may be bonded to the opposing surfaces of the ribs or threads 23 and 24 thus producing the structure shown in Fig. 1 with the elastic material disposed between the threads 23 and 24. This not only provides an increased surface to which the rubber or rubber-like material may be bonded, but it will also be obvious that upon an axial thrust upon the bearing, the load will be carried by the threads and not by the bond between the rubber and the metal as would be the case if an inner and outer ring member were provided with plane surfaces. Moreover, when the ends of the threads overlap each other, as shown, the elastic material will actually be under compression in resisting a load in an axial direction and not under shear. This will not only suppress the axial play which would otherwise be permitted, but will also prolong the life of the mounting. The end edges of the ring 17 may be perfected by placing annular washers 26 in recesses 27, as shown in Fig. 1.

A similar but less efficient result can be obtained when plain ribs are provided upon the inner and outer ring members 23 and 24 which would not interfere but which would barely clear each other so that they can be assembled merely by one being thrust within the other without the rotating or threading movement. In such a structure the rubber would be under shear to some extent, but as the tip edges of the ribs would be very close together, the shear would not be pronounced.

Figure 4:
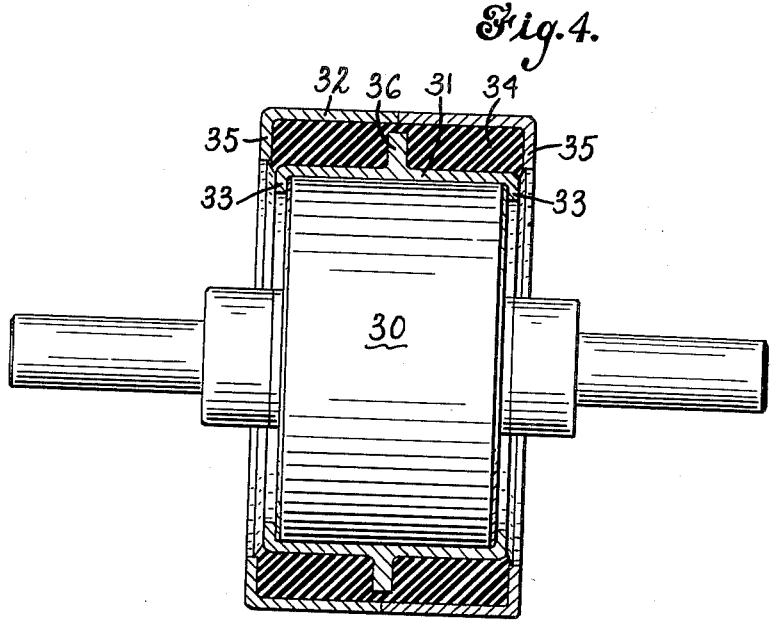

In Fig. 4 is shown a slightly modified form of our invention wherein a standard bearing is shown at 30, this bearing being carried by a mount comprising an inner ring 31 and an outer ring 32. The edges 33 of the inner ring may be spun over the bearing to hold the latter in place as before, and between the two rings the elastic material 34 is disposed, which material may be bonded to both inner and outer rings. In this form of our invention, the edges of the outer ring are spun over, as shown at 35.

The inner ring is provided with an outwardly projecting rib 36 substantially at the center thereof, and it will be seen that the elastic material 34 will be placed under compression, upon an axial load, between this rib and the flanges 35. For purposes of manufacture and assembly, the ring 32 may be made in two equal halves as shown.

Figure 5:
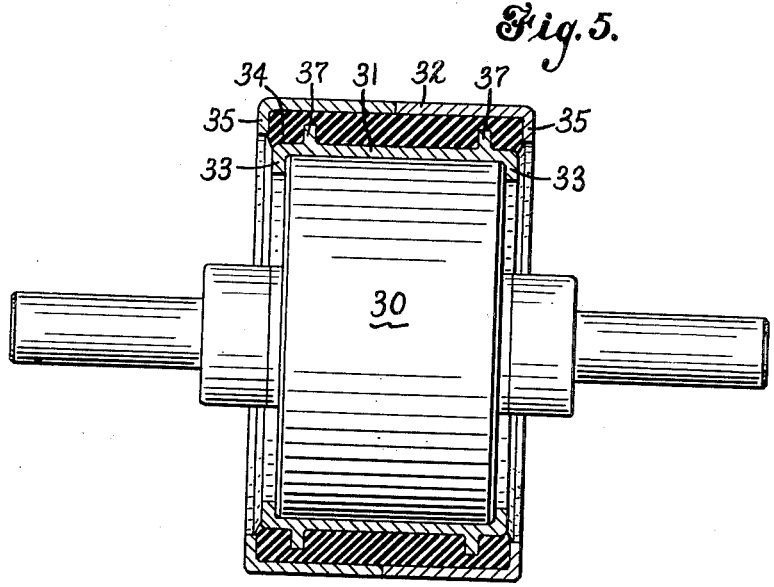
Fig. 5 is a view similar to Fig. 4 showing a further modification.

The form of our invention shown in Fig. 5 is similar to that shown in Fig. 4, and the corresponding parts are similarly numbered. In this instance, however, the inner ring 31 is provided with two annular ribs 37 which may be disposed in positions spaced inwardly to some extent from the edges of the bearing 30. These ribs 37 will act in the same manner as the annular rib 36 shown in Fig. 4 and place the elastic material 34 under compression when the bearing is subjected to an axial load as before.

While we have shown and described some preferred embodiments of our invention, it will be understood that it is not to be limited to all of the details shown, but is capable of modification and variation within the spirit of the invention and within the scope of the claims.

What we claim is:

1. In a bearing construction, a bearing race, a one-piece inner member embracing said bearing race and fixed thereto against axial movement, said member having a generally cylindrical outer surface, a one-piece outer member having a generally cylindrical inner surface disposed in spaced relation to and embracing the outer surface of said first member, a cushion of elastic material disposed in the space between said members, each of said surfaces having projections thereon extending toward the other member to place said material under compression when an axial thrust is applied to one of said members, the material of said cushion being bonded to the opposing surfaces of both said members, and the ends of the projections on one member extending beyond those on the other member to limit relative axial movement of the members.

2. In a bearing construction, a bearing having an outer race, an inner member embracing said race and fixed thereto against axial movement relatively to the race, said member having a generally cylindrical outer surface, an outer member having a generally cylindrical inner surface disposed in spaced relation to and embracing the outer surface of the first member, a cushion of an elastomer filling the space between said members, said members having projecting helical threads on the opposing surfaces thereof, the crests of the threads on one member projecting beyond the crests of the threads on the other member, and the material of said cushion being bonded to the threads of both said members to limit relative axial movement of said members.

3. In a bearing construction, a bearing having an outer race, an inner member embracing said race and fixed thereto against relative axial movement, said member having a generally cylindrical outer surface, an outer member having a generally cylindrical inner surface disposed in spaced relation to, and embracing, the outer surface of the first member, the opposing surfaces of said members being provided with mating screw threads with the threads of one member lying between the threads of the other member and being spaced therefrom, and the space between said threads being occupied by a cushion of an elastomer material, and said material being securely bonded to the opposing surfaces of the screw threads of both said members.

References Cited in the file of this patent

UNITED STATES PATENTS

| Number | Name | Date |
|---|---|---|
| 1,851,561 | Baninger | Mar. 29, 1932 |
| 2,092,291 | Olsen | Sept. 7, 1937 |
| 2,231,037 | Taylor | Feb. 11, 1941 |
| 2,235,605 | Bugatti | Mar. 18, 1941 |
| 2,365,875 | Hersey | Dec. 26, 1944 |

FOREIGN PATENTS

| Number | Country | Date |
|---|---|---|
| 690,685 | France | Sept. 24, 1930 |